Patented July 10, 1951

2,559,752

UNITED STATES PATENT OFFICE 2,559,752

AQUEOUS COLLOIDAL DISPERSIONS OF POLYMERS

Kenneth L. Berry, Hockessin, Del., assignor to E. I. du Pont de Nemours and Company, Wilmington, Del., a corporation of Delaware No Drawing. Application March 6, 1951, Serial No. 214,223

22 Claims. (Cl. 260—29.6)

This invention relates to aqueous colloidal dispersions of polymers and, more particularly, to a process for the polymerization of unsaturated organic compounds in aqueous media. This application is a continuation-in-part of applicant's copending application Serial No. 171,241, filed June 29, 1950, itself a continuation-in-part of application Serial No. 107,137, filed July 27, 1949, and abandoned September 7, 1950.

Polymers of unsaturated organic compounds are conveniently handled in aqueous dispersions. Frequently, however, such dispersions are not readily obtainable, or not obtainable at all, by direct polymerization of the unsaturate in aqueous media in the presence of a dispersing agent. In many instances, polymerization either fails to take place or proceeds only to a very low conversion; moreover, the polymer dispersion, if obtained, may be unstable and/or the particle size may be undesirably large. These failures, which are particularly noticeable with the haloethylenes such as tetrafluoroethylene or chlorotrifluoroethylene, have been attributed to the fact that conventional dispersing agents tend to stop the polymerization at an undesirably short chain length. Moreover, in many cases, and again especially with haloethylenes, the preformed, finely-divided polymer is not readily dispersible in water and such dispersions, when obtained, are often characterized by lack of stability and coarse particle size.

An object of the present invention is to provide improved stable aqueous colloidal dispersions of polymers and a process of polymerizing monomeric ethylenically unsaturated organic compounds in an aqueous medium to obtain such improved polymer dispersions. A further object is to provide an improved process of polymerizing whereby the polymerization rate is faster than heretofore feasible and a stable colloidal dispersion of exceptionally fine polymer particles may be obtained. A more particular object is to provide improved stable aqueous colloidal dispersions of polymerized haloethylenes, especially tetrafluoroethylene and chlorotrifluoroethylene. A more specific object is to provide a process whereby tetrafluoroethylene and chlorotrifluoroethylene polymer dispersions having greater than 15% polymer content may be economically prepared. Other objects will be apparent from the description of the invention given hereinafter.

The above objects are accomplished according to the present invention by the step of carrying out the polymerization of a polymerizable monomeric ethylenically unsaturated organic compound in an aqueous medium in the presence of a water-soluble polymerization initiator and, as an ionizable dispersing agent, a water-soluble compound comprising an ionic (i. e., cationic or anionic) hydrophilic group and a hydrophobic portion, said latter being a fluoroalkyl group containing at least six aliphatic carbon atoms, all except at most one of which, and that one the closest to said solubilizing group, bearing at least two fluorine atoms, the terminal carbon atom bearing in addition an atom from the group consisting of hydrogen and fluorine. In a preferred form, particularly when the monomer to be polymerized is a haloethylene, the polymerization is carried out in the presence of both the dispersing agent as defined above and, as a stabilizer, 0.1%–12%, by weight of the aqueous medium, of a saturated hydrocarbon having more than 16 carbon atoms and which is liquid under the polymerization conditions.

The present invention resides primarily in the discovery that the above mentioned ionizable water-soluble compounds comprising a cationic or anionic hydrophilic group and a hydrophobic portion, act as surprisingly efficient dispersing agents and allow the preparation directly by the polymerization of monomeric ethylenically unsaturated organic compounds in aqueous media, of stable, concentrated aqueous colloidal dispersions of the respective polymers, such dispersions often showing concentrations of 15% to 30%, and even considerably higher, of polymer even in the case of haloethylenes such as tetrafluoroethylene and chlorotrifluoroethylene where direct polymerization in aqueous systems is practically impossible to achieve with the use of conventional dispersing agents. Furthermore, in many cases, a polymer of higher molecular weight is obtained by dispersion polymerization in the presence of the instant dispersing agents than with the conventional dispersing agents. Moreover, the instant dispersing agents lead to polymer dispersions in which the particle size of the polymer is extremely small, the particles usually have at least one dimension of less than 0.1 micron. In addition, the instant dispersing agents often result in a considerable increase in the rate of polymerization.

The polymerization of the monomer in an aqueous medium containing a dispersing agent as herein defined and a water-soluble polymerization initiator is carried out in accordance with the known general procedures. Pressures of 1 to 3000 atmospheres and temperatures of 0° C. to 200° C. or higher can be used, the normally preferred ranges being a pressure of 1 to 1000 atmospheres and a temperature of 20° C. to 100° C. The polymerization initiator is a water-soluble free radical-producing initiator, preferably a water-soluble peroxy compound, which can be inorganic, e. g., persulfates, perborates, percarbonates, hydrogen peroxide, or organic, e. g., disuccinic acid peroxide. The most efficient and useful initiators are ammonium persulfate and alkali metal persulfates, e. g., sodium persulfate and potassium persulfate. There may also be used water-soluble azo initiators, e. g., disodium gamma,gamma' - azobis(gamma - cyanovalerate) (U. S. Patent 2,471,959), or alpha,alpha'-azodiisobutyramidine hydrochloride. The initiator is normally used in proportions of 0.001% to 5%, based on the weight of polymerizable monomer employed, 0.01% to 2% being preferred, although smaller or larger amounts may be used. Numerous suitable polymerization initiators or catalysts, are disclosed in U. S. Patents 2,393,967; 2,394,243; and 2,534,058. Polymerization may be also initiated by ultraviolet light irradiation in the presence of photopolymerization catalysts such as uranyl nitrate, benzoin, and the like.

Optionally, it may be advantageous to include with the polymerization initiator a polymerization promoter such as a water-soluble salt of an oxidizable sulfoxy compound which yields sulfur dioxide on treatment with acids, e. g., sodium sulfite, sodium bisulfite, sodium thiosulfate, sodium hydrosulfite and the like. In addition, a small amount of a water-soluble ferrous salt, e. g., ferrous sulfate, is advantageously present in amount sufficient to provide from 0.2 to 50 parts per million of ferrous ions based on the weight of the aqueous medium. Also, optionally, the aqueous polymerization system may include buffers such as borax, disodium phosphate, ammonium carbonate, sodium acetate and the like. Finely-divided inert solids serving as fillers may be included in the polymerization mixture, such as alumina, titanium dioxide, silica and the like. These inert solids are more advantageously employed as preformed aqueous colloidal dispersions.

The dispersing agents of the present invention may be represented by the general formula B(CF$_2$)$_n$(CH$_2$)$_m$A where B is hydrogen or fluorine, $n$ is an integer at least equal to 5, $m$ is 0 or 1, the sum of $m+n$ is at least equal to 6, and A is an ionic (cationic or anionic) hydrophilic group. It will be evident that these dispersing agents are all fluoroalkyl compounds.

The hydrophilic group in the fluoroalkyl dispersing agent used in the present invention can be any of the well known anionic or cationic hydrophilic groups commonly present in the more conventional types of surface-active agents. For example, it can be a carboxylic acid group, —COOH, present as such or as a salt of an alkali metal, ammonia, an amine, or a quaternary ammonium hydroxide; a phosphoric acid group, —OPO(OM)$_2$, or a sulfuric acid group, —OSO$_2$(OM), where M is hydrogen, alkali metal, ammonium or substituted ammonium; a phosphonic acid group, —PO(OM)$_2$, where M is as above; or an amine group, e. g., —NH$_2$ or

where R is alkyl, present as a salt of a strong acid or as quaternary ammonium compound. The specific hydrophilic group is not critical provided it confers upon the compound as a whole a solubility in water of at least 0.1% at 100° C., which is necessary for the dispersing agent to perform satisfactorily in aqueous polymerization systems. The term "water-soluble" as applied herein to the dispersing agent denotes a minimum solubility in water of 0.1% at 100° C. While a chain length of at least 6 aliphatic carbons in the hydrophobic portion of the molecule is desirable in order that the product possess sufficient surface-active properties, the above-mentioned minimum solubility will, in general, restrict the integer $n$ in the above formula, i. e., the number of difluoromethylene groups, to not more than 20 and, usually, to not more than 12. With the less active hydrophilic groups, preferably $n$ will not exceed 8.

Among the dispersing agents suitable for use in the present invention certain groups of compounds are particularly advantageous and these are discussed below:

A. The polyfluoroalkanoic acids of the formula B(CF$_2$)$_n$COOH, where $n$ is an integer from 6 to 20, inclusive, but, preferably from 6 to 12, inclusive, and B is hydrogen or fluorine, and their alkali metal, ammonium, amine or quaternary ammonium salts. The polyfluoroalkanoic acids of the formula H(CF$_2$)$_n$COOH, where $n$ is an even integer may be prepared according to the method described in applicant's copending application Ser. No. 65,065, filed on December 13, 1948. This method consists in oxidizing, with a permanganate as the oxidizing agent, a polyfluoroalkanol of the formula H(CF$_2$CF$_2$)$_n$CH$_2$OH where $n$ is an integer. These polyfluoroalkanols are themselves obtained, according to copending application Serial No. 65,063, filed in the name of R. M. Joyce on December 13, 1948, by heating at a temperature between 75° C. and 350° C., in the presence of a free radical-producing catalyst, a mixture of methanol and tetrafluoroethylene. The polyfluoroalkanoic acids of the formula F(CF$_2$)$_n$COOH, where $n$ is even or odd, have recently become available commercially.

The free polyfluoroalkanoic acids can be used, for example, those containing between 7 and 11 carbon atoms, inclusive. However, the solubility of the free acids in water is rather low. For this reason, it is preferred to use these acids in the form of salts. These salts of polyfluoroalkanoic acids include, for example, the ammonium and alkali metal (e. g., sodium, potassium or lithium) salts of dodecafluoroheptanoic acid, H(CF$_2$)$_6$COOH; pentadecafluorooctanoic acid, F(CF$_2$)$_7$COOH; hexadecafluorononanoic acid, H(CF$_2$)$_8$COOH; heptadecafluorononanoic acid, F(CF$_2$)$_8$COOH; eicosafluoroundecanoic acid, H(CF$_2$)$_{10}$COOH; tetracosafluorotridecanoic acid, H(CF$_2$)$_{12}$COOH; and the like. Salts of these acids with saturated alkylamines, preferably of 1 to 4 carbon atoms, i. e., substituted ammonium salts can also be used to advantage, as well as salts of quaternary ammonium bases such as, for example, tetraethanolammonium hydroxide. It is not necessary to use a salt of an isolated individual acid. On the contrary, since the starting polyfluoroalkanols and/or polyfluoroalkanoic acids are generally obtained as mixtures of components of variable chain length, it is more economical in practice to use salts of mixed acids B(CF$_2$)$_n$COOH, wherein $n$ may vary between 6 and 20, and, preferably, averages from 6 to 12.

B. The phosphoric acid esters of polyfluoroalkanols. These polyfluoroalkyl phosphates have the general formula B(CF$_2$)$_n$CH$_2$OPO(OM)$_2$, where B is hydrogen or fluorine, $n$ is an integer from 5 to 10, preferably from 5 to 8, and M is hydrogen, alkali metal, ammonium, substituted ammonium (e. g., saturated alkylamine of 1 to 4 carbon atoms), or quaternary ammonium. These esters may be prepared by treating a polyfluoroalkanol with phosphorus pentoxide or phosphorus oxychloride. The polyfluoroalkanols may be those having the formula $H(CF_2CF_2)_nCH_2OH$ of the above mentioned application Serial No. 65,063 or they may be those having the formula $F(CF_2)_nCH_2OH$, which alcohols are in turn prepared by reduction of the corresponding fluorocarboxylic acids, which have recently been described. The polyfluoroalkyl phosphates are described and claimed in U. S. application Serial No. 171,246, filed June 29, 1950, in the name of A. F. Benning and the use of certain di-phosphates not included among the dispersing agents as defined in the claims herein, in aqueous dispersion polymerization of ethylenic compounds is more particularly described and claimed in U. S. application Serial No. 171,247, filed June 29, 1950, in the name of A. F. Benning, Representative examples of these phosphates are ammonium dodecafluoroheptyl phosphate, $$H(CH_2)_6CH_2OPO(OH)(ONH_4)$$

ammonium hexadecafluorononyl phosphate, $$H(CF_2)_8CH_2OPO(OH)(ONH_4)$$

dodecafluoroheptyl dihydrogen phosphate, $$H(CF_2)_6CH_2PO(OH)_2$$

hexadecafluorononyl dihydrogen phosphate, $$H(CF_2)_8CH_2PO(OH)_2$$

sodium heptadecafluorononyl phosphate, $$F(CF_2)_8CH_2OPO(OH)(ONa)$$

and potassium nonadecafluorodecyl phosphate, $F(CF_2)_9CH_2OPO(OH)(OK)$.

There may also be used the di(fluoroalkyl)-phosphates of the formula $$(B(CF_2)_nCH_2O)_2PO(OM)$$

where B is hydrogen or fluorine and $n$ is an integer at least equal to 5, which are prepared in substantially the same manner as the mono-(fluoroalkyl) phosphates. Among these may be mentioned ammonium di(hexadecafluorononyl) phosphate; ammonium di(eicosafluorohendecyl) phosphate; and the like.

C. The sulfuric acid esters of polyfluoroalkanols. These polyfluoroalkyl sulfates have the general formula $B(CF_2)_nCH_2OSO_3M$ where B, $n$ and M have the significance discussed above under (B). These polyfluoroalkyl sulfates are more particularly described and claimed in U. S. application Serial No. 171,242, filed June 29, 1950, in the names of K. L. Berry and J. A. Bittles, Jr. They can be prepared by treatment with chlorosulfonic acid or with concentrated sulfuric acid, preferably containing sulfuric anhydride, of the polyfluoroalkanols mentioned under (A) and (B). As examples of these polyfluoroalkyl sulfates may be mentioned ammonium hexadecafluorononyl sulfate, $H(CF_2)_8CH_2OSO_3NH_4$; potassium dodecafluoroheptyl sulfate, $H(CF_2)_6CH_2OSO_3K$; sodium heptadecafluorononyl sulfate, $$F(CF_2)_8CH_2OSO_3Na$$

and ammonium nonadecafluorodecyl sulfate, $$F(CF_2)_9CH_2OSO_3NH_4$$

D. Polyfluoroalkylphosphonic acids and their salts. These dispersing agents have the formula $H(CF_2)_nPO(OM)_2$ where n is an even integer from 6 to 12, inclusive, and M is hydrogen, alkali metal, ammonium or substituted ammonium, e. g., saturated alkylamine of 1 to 4 carbon atoms. These phosphonic acids, which are more particularly described and claimed in U. S. application Serial No. 171,243, filed June 29, 1950, in the names of J. A. Bittles, Jr., and R. M. Joyce, can be prepared by reacting tetrafluoroethylene with a dialkyl phosphite, such as diethyl phosphite, in the presence of a free radical-producing catalyst. The reaction product is a polyfluoroalkyl phosphonic ester, e. g., $H(CF_2)_nPO(OC_2H_5)_2$ which can be hydrolyzed by treatment with concentrated sulfuric acid or hydrochloric acid. The resulting phosphonic acid can be used as such, or it can be partly or completely neutralized by alkali metal hydroxides, ammonia or amines. The free phosphonic acids have the specific advantage of being soluble in strong acids such as 20% sulfuric acid or 98% sulfuric acid and thus they may be used in acidic polymerization systems. Examples of these dispersing agents are dodecafluorohexylphosphonic acid, $H(CF_2)_6PO(OH)_2$; ammonium hexadecafluorooctyl phosphonate, $H(CF_2)_8PO(ONH_4)_2$; and sodium eicosafluorodecylphosphonic acid, $H(CF_2)_{10}PO(ONa)_2$.

E. Polyfluoroalkylamine salts. These polyfluoroalkylamines have the general formula

where B is hydrogen or fluorine, $n$ is an integer from 5 to 12, inclusive, and R is hydrogen or a low alkyl group, e. g., an alkyl group of 1 to 4 carbon atoms. The polyfluoroalkylamines where the amino group is primary may be prepared by reduction of the corresponding polyfluoroalkanoic acid amides (themselves obtained from the acid chlorides), the reducing agent being preferably lithium aluminum hydride, used in an anhydrous medium such as absolute ether. The fluoroalkylamines of the formula $H(CF_2)_nCH_2NH_2$ are more particularly described and claimed in U. S. application Serial No. 171,244, filed June 29, 1950, in the names of James Elliot Carnahan and Herman Julian Sampson. Fluoroalkylamines where the amino group is tertiary (that is, two of the remaining nitrogen valences are satisfied by low alkyl groups) can be prepared by reacting tetrafluoroethylene with a tertinary amine in the presence of a free radical-producing catalyst (see British Patent 583,874). For use in aqueous polymerization systems, the fluoroalkylamines are converted to salts with strong acids, preferably with acids having a dissociation constant above $1 \times 10^{-5}$, still more preferably with strong non-oxidizing mineral acids. Examples of dispersing agents belonging to this class are dodecafluoroheptylamine hydrochloride, $$H(CF_2)_8CH_2NH_2.HCl$$

hexadecafluorononylamine sulfate, $$H(CF_2)_8CH_2NH_2.H_2SO_4$$

pentadecafluorooctylamine phosphate, $$F(CF_2)_7CH_2NH_2.H_3PO_4$$

N,N-dimethyl hexadecafluorononylamine hydrochloride, $H(CF_2)_8CH_2N(CH_3)_2.HCl$, and the like. The invention is illustrated in greater detail in the following examples in which parts are by weight unless otherwise noted.

Examples I to XIV following illustrate the invention wherein the dispersing agent used is a water-soluble salt of a polyfluoroalkanoic acid falling under group A discussed above.

EXAMPLE I

A solution in 100 parts of distilled water of two parts of a mixture of polyfluoroalkanoic acids $H(CF_2)_nCOOH$ where $n$ has an average value of 10.6 as indicated by a neutral equivalent of 577, was heated to boiling and neutralized with sodium hydroxide. The resulting soapy solution was filtered at the boiling point into a pressure vessel having a capacity of 325 parts by volume. To the solution, maintained by external heating at 65° C.–70° C. was added 0.025 part of ammonium persulfate, after which the vessel was evacuated and maintained at reduced pressure for a few minutes while the solution was boiling in order to remove the dissolved atmospheric oxygen. A cylinder of tetrafluoroethylene gas under a pressure of fifty-five lbs./sq. in. was connected to the reaction vessel, which was mechanically shaken for 13.1 hours at 65° C.–70° C. while the tetrafluoroethylene was made continuously available at an average pressure of 40–60 lbs./sq. in. The reaction product was a colloidal dispersion of polytetrafluoroethylene, which dispersion contained 49% by weight of the polymer. This dispersion had high clarity with a bluish opalescence. At 5% solids concentration it was perfectly transparent. It was highly stable, showing no tendency to settle permanently or coagulate even on long standing. Electron photomicrographs showed that about 90% of the particles had a minor dimension between 0.01 and 0.03 micron, with some particles between about 0.03 and about 0.05 micron. Another characteristic of this dispersion was that a number of the particles were ribbon shaped.

EXAMPLE II

A mixture of 1 part of potassium hexadecafluorononanoate, 0.25 part of borax, 0.5 part of potassium persulfate and 0.25 part of sodium bisulfite was dissolved in sufficient water to make a total of 100 parts. The solution was agitated for 1.8 hours at 71° C.–78° C. under 50–60 lbs./sq. in. of tetrafluoroethylene pressure. There resulted a polytetrafluoroethylene dispersion containing 19% polymer, in which the particles ranged in minor dimension from 0.01 to 0.05 micron and in which many of the particles were elongated. The dispersion was slightly opalescent and had high clarity.

EXAMPLE III

To a solution of 2 parts of ammonium dodecafluoroheptanoate, $H(CF_2)_6COONH_4$, in 93 parts of distilled water placed in a pressure vessel was added 0.05 part of potassium persulfate and, as a stabilizer, 5 parts of a paraffin wax melting at 56° C.–58° C., the latter serving to protect the colloid against the coagulating influence of the subsequent agitation. This mixture was brought up to 80° C.–85° C. and the vessel was evacuated and kept under reduced pressure for several minutes to remove air and dissolved oxygen. Tetrafluoroethylene gas was admitted to the vessel until a gauge pressure of 60 lbs./sq. in. was reached. The reaction vessel was continuously agitated at 80° C.–85° C. for 3.6 hours, during which time the gas pressure was brought back to 60 lbs./sq. in. each time it dropped to 55 lbs./sq. in. as a result of conversion of the gas to polymer. The reaction product was a colloidal dispersion of polytetrafluoroethylene containing 34% solids. Electron photomicrographs showed that substantially all the polymer particles were elongated ribbons about 0.05 micron thick, 0.1–0.2 micron wide, and on the average 0.75 micron long.

EXAMPLE IV

A pressure vessel was charged with 0.5 part of ammonium eicosafluoroundecanoate, 0.2 part of potassium persulfate, 2 parts of a paraffin wax melting at 56° C.–58° C., and distilled water to a total of 100 parts, heated to 73° C.–76° C., and evacuated. The vessel was then pressured to 53 lbs./sq. in. gauge pressure with a gas mixture comprising 76 parts of tetrafluoroethylene and 24 parts of chlorotrifluoroethylene, and the gas mixture was made continuously available to the pressure vessel. The latter was agitated for 5.3 hours. The reaction product was a clear, bluish-opalescent dispersion of tetrafluoroethylene/chlorotrifluoroethylene copolymer in the ratio of 76/24. The dispersion contained 16% solids; the polymer particles were spheroidal and less than 0.1 micron in diameter.

EXAMPLE V

A mixture of 1 part of ammonium hexadecafluorononanoate and 0.1 part of potassium persulfate was embedded in approximately 3 parts of paraffin by melting the latter. The resulting block of paraffin containing the initiator and dispersing agent was placed in a glass-lined pressure vessel with 100 parts of distilled water. The vessel was evacuated to remove air and dissolved oxygen and then pressured with tetrafluoroethylene gas to a pressure of 225 lbs./sq. in. Ethylene gas was next admitted to the vessel until a total pressure of 450 lbs./sq. in. was obtained. The vessel was rocked at 65° C. for 8 hours, during which time the pressure increased initially to 525 lbs./sq. in. and dropped steadily to 380 lbs./sq. in. at the end. The reaction product was a highly fluid, aqueous, colloidal dispersion of tetrafluoroethylene/ethylene copolymer containing 12.4% solids. The copolymer contained 60.5% fluorine, corresponding to a tetrafluoroethylene/ethylene molar ratio of 1:0.91. The polymer particles were spheroidal and from 0.05 to 0.1 micron in diameter. Polymer isolated from this dispersion by coagulating, washing, and drying, softened on a copper block at 260° C.–270° C. to a colorless, viscous, sticky melt. The polymer could be hot pressed at about 300° C. to tough, flexible films, strips of which could be cold drawn.

EXAMPLE VI

Two parts of potassium hexadecafluorononanoate, 2 parts of refined paraffin (M. P. 56° C.–58° C.) as a stabilizer, 0.05 part of potassium persulfate and distilled water to a total of 100 parts were charged into a pressure vessel having a volume capacity of 325 parts of water. The vessel was heated to 70° C.–78° C. and evacuated until the water boiled. Tetrafluoroethylene gas was then supplied to the vessel at 60 lbs./sq. in. pressure and the vessel was agitated. As the tetrafluoroethylene was absorbed and polymerized the pressure dropped to 55 lbs./sq. in. and the vessel was repressured to 60 lbs./sq. in. This was repeated ten times during 5.4 hours. Of the 84.6 parts of polytetrafluoroethylene formed, 97% was present as a colloidal aqueous dispersion containing 49% solids. The remaining 3% was coagulated and it was contained in the separate paraffin phase which solidified when the reaction mixture was cooled and was readily removed from the surface of the dispersion.

This example was substantially duplicated except that the paraffin was omitted and that 50% more (a total of 3 parts) of potassium hexadecafluorononanoate was used. After 3.6 hours polymerization time, the dispersion contained 36% solids, of which only 84% was present as a colloidal dispersion, the rest being coagulated polymer. This comparison shows the effectiveness of the paraffin stabilizer which prevents coagulation of the polymer particles to a large extent.

EXAMPLE VII

A series of runs was carried out in a pressure vessel to illustrate particular advantages of the present invention. In each run the vessel was charged with 100 parts of water, 5 parts of paraffin wax (melting point 55° C.–60° C.) as a stabilizer, and the amounts of polyfluoroalkanoate dispersing agent and catalyst as follows:

*Batch A.*—0.05 part of disuccinic acid peroxide catalyst and 0.27 part of dispersing agent consisting of 67% ammonium hexadecafluorononanoate and 33% ammonium eicosafluoroundecanoate;

*Batch B.*—0.02 part of hydrogen peroxide catalyst and 0.25 part of ammonium hexadecafluorononanoate dispersing agent;

*Batch C.*—0.005 part of ammonium persulfate catalyst and 0.025 part of ammonium hexadecafluorononanoate dispersing gent;

*Batch D.*—0.067 part of disuccinic acid peroxide catalyst and 0.27 part of dispersing agent consisting of 67% ammonium hexadecafluorononanoate and 33% ammonium eicosafluoroundecanoate.

In each run the reaction mixture was vigorously agitated under a tetrafluoroethylene monomer pressure of 300–350 lbs./sq. in. at the temperature and for the period indicated in the following table.

Table

| Batch | Temp., °C. | Polym. Cycle, hrs. | Per Cent Polymer in Dispersion | Per Cent Polymer Dispersed | Rate, g./l./hr. |
|---|---|---|---|---|---|
| A | 80 | 1.48 | 34.5 | 100 | 358 |
| B | 70 | .89 | 31 | 99.3 | 510 |
| C | 70 | .90 | 24.7 | 99.1 | 361 |
| D | 80 | .79 | 30.5 | 100 | 555 |

"Rate (g./l./hr.)" in the table designates the number of grams of tetrafluoroethylene polymer formed per liter of aqueous dispersion medium (water) per hour. While each batch illustrates the effectiveness of the herein considered dispersing agents, batch C is particularly noteworthy in that only 0.025 part of dispersing agent per 100 parts of water was used. Batch D is also of interest in showing such a marked increase in the polymerization rate. As against the rate of 555 g./l./hr. in batch D, the rate in the absence of the dispersing agent but using the same catalyst normally varies from 15 to 50 g./l./hr. with only isolated cases where the rate has been as high as 100 g./l./hr.

EXAMPLE VIII

Seventy-five parts of water was boiled under nitrogen and 0.5 part of the ammonium salts of a mixture of polyfluoroalkanoic acids of the formula $H(CF_2)_nCOOH$ in which n ranges from 5 to 13, inclusive, and, predominantly, from 8 to 10, was dissolved in the hot water. The resulting solution was cooled under a blanket of nitrogen and 0.5 part of ammonium persulfate and 0.1 part of ammonium sulfite $((NH_4)_2SO_3.H_2O)$ were added and the catalyst solution was poured into a reaction bomb from which air had been swept by a stream of nitrogen. The bomb was closed and cooled with Dry Ice, the nitrogen pumped off, and 50 parts of chlorotrifluoroethylene was introduced by distillation. The bomb was tumbled end over end in a 40° C. water bath for 16 hours with the conversion of more than 85% of the chlorotrifluoroethylene monomer to polymer.

The dispersion obtained contained 36% solids, the polymer particles being shown by photomicrographs as 0.1–0.2 micron in diameter. By contrast, an identical run using potassium persulfate instead of ammonium persulfate, its full equivalent, but omitting the dispersing agent altogether, resulted in only 3.4 parts of an unwetted granular polymer being obtained plus a coarse aqueous suspension of polymer which settled overnight to give 5 parts of polymer.

EXAMPLE IX

A solution of 4 parts of disodium hydrogen phosphate, 2 parts of potassium persulfate and 1.5 parts of ammonium hexadecafluorononanoate in 190 parts of oxygen-free distilled water was charged into a stainless steel bomb having a volume capacity of 1600 parts of water. The bomb was flushed with nitrogen and evacuated, then charged with 150 parts of deoxygenated ethylene. A solution of 0.4 part of silver nitrate and 0.4 part of sodium bisulfite in 10 parts of water was then added and the bomb was agitated at 30° C. for 20 hours. There was obtained an aqueous dispersion of ethylene polymer. This dispersion was acidified and the polymer was collected by filtration, washed with water and air dried. The ethylene polymer had an inherent viscosity of 0.62 and a bending modulus of 77,000 lbs./sq. in.

EXAMPLE X

A mixture of 60 parts of water, 40 parts of acrylonitrile, 0.05 part of potassium persulfate, 0.017 part of sodium bisulfite and 0.5 part of ammonium hexadecafluorononanoate was placed in a glass vessel. The vessel was swept with nitrogen and agitated at 40° C. for 15.5 hours. There was obtained a stable aqueous dispersion of polyacrylonitrile, containing 35.5% solids.

EXAMPLE XI

A mixture of 100 parts of 2-chloro-1,3-butadiene, 0.4 part of dodecyl mercaptan and a solution of 2 parts of ammonium hexadecafluorononanoate and 0.6 part of potassium persulfate in 157 parts of copper-free distilled water was emulsified in a homogenizing mixer and maintained under nitrogen at 40° C. for 2.5 hours with continuous stirring. The resulting aqueous polymer dispersion was coagulated by adding it to saturated brine. The polymer was washed, then dried on mill rolls at 50–60° C. to give 70 parts of rubbery polychloroprene.

EXAMPLE XII

One part of a mixture of hexadecafluorononanoic acid and eicosafluoroundecanoic acid, said mixture having a neutralization equivalent of 460, corresponding to the empirical formula $$H(CF_2)_{8.3}COOH$$

was suspended in 70 parts of distilled water at 40–50° C. and the suspension was neutralized by the dropwise addition of a 30% aqueous solution of trimethylamine. The resulting solution of the trimethylamine salts of the polyfluorocarboxylic acids was placed in a pressure vessel having a volume capacity of 325 parts of water, deaerated by evacuation, and blanketed with nitrogen. To this solution was added 0.05 part of potassium persulfate and 30 parts of purified vinyl acetate. The vessel was then closed and agitated for two hours in a water bath at 65° C. There was obtained an aqueous colloidal dispersion of polyvinyl acetate containing 30.3% solids.

EXAMPLE XIII

The procedure of Example XII was repeated except that the acid mixture was neutralized with a 40% aqueous solution of tetraethanolammonium hydroxide, $(HOCH_2CH_2)_4N(OH)$. The resulting solution of quaternary ammonium salts of polyfluorocarboxylic acids was used in the polymerization of vinyl acetate under the above-described conditions except that the polymerization time was 2.5 hours. There was obtained a stable aqueous colloidal dispersion containing 24.3% by weight of polyvinyl acetate.

EXAMPLE XIV

The procedure of Example XII was repeated except that a 10% aqueous solution of tetraethylammonium hydroxide was used to neutralize the polyfluorocarboxylic acid mixture. The resulting solution of the tetraethylammonium salts of the polyfluorocarboxylic acids was used in the polymerization of vinyl acetate as above, at 65° C. for 2.5 hours. The product was a stable bluish aqueous dispersion of polyvinyl acetate containing 29.6% solids.

Examples XV to XIX following illustrate the invention wherein the dispersing agent used is a water-soluble phosphoric acid ester of a polyfluoroalkanol falling under group B discussed above:

EXAMPLE XV

A mixture of 2 parts of monoammonium monododecafluoroheptyl phosphate, 0.05 part of potassium persulfate, 5 parts of paraffin (M. P. 56–58° C.), and distilled water to a total of 100 parts was placed in a pressure vessel having a volume capacity of 325 parts of water at room temperature, and heated to 71–72° C. The vessel was evacuated to remove air and then pressured to 51–54 lbs./sq. in. with tetrafluoroethylene gas. The vessel was agitated for 2.3 hours, during which time the tetrafluoroethylene pressure was maintained at about 55 lbs./sq. in. by repressuring as needed. At the end of this time there was obtained an aqueous colloidal dispersion of film-forming polytetrafluoroethylene containing 32% solids.

EXAMPLE XVI

A pressure vessel having a volume capacity of 400 parts of water at room temperature was flushed with nitrogen and charged with 200 parts of copper-free deoxygenated water, 2 parts of disodium hydrogen phosphate $(Na_2HPO_4 \cdot 7H_2O)$, 0.4 part of potassium persulfate and 4.3 parts of monoammonium hexadecafluorononyl phosphate. The vessel was evacuated, pressured to 900–1000 atmospheres with deoxygenated ethylene, heated to 70° C. and agitated at that temperature for 12 hours. There was obtained an aqueous dispersion of ethylene polymer containing 9.5% solids.

EXAMPLE XVII

A mixture of 0.5 part of dodecafluoroheptyl dihydrogen phosphate, $H(CF_2)_6CH_2OPO(OH)_2$, 0.05 part of potassium persulfate, 5 parts of paraffin and sufficient water to make up 100 parts was heated to 70–73° C. and deaerated by short boiling under reduced pressure. The mixture was maintained under 60 lbs./sq. in. tetrafluoroethylene pressure and agitated 4.8 hours at 70–73° C. There was obtained an aqueous colloidal dispersion of polytetrafluoroethylene containing 27.9% solids.

EXAMPLE XVIII

The experiment of Example XVII was repeated except that the dispersing agent was hexadecafluorononyl dihydrogen phosphate $$H(CF_2)_8CH_2OPO(OH)_2$$

and the reaction time was 3.2 hours. The colloidal dispersion so obtained contained 18.8% polytetrafluoroethylene.

EXAMPLE XIX

A 200 cc. stainless steel bomb was swept with oxygen-free $N_2$, and under this $N_2$ blanket there was added a catalyst solution of the following composition:

| | G. |
|---|---|
| Water (distilled, boiled O-free) | 65.0 |
| $(NH_4)_2S_2O_8$ | 0.5 |
| $(NH_4)_2SO_3$ | 0.1 |
| $AgNO_3$ | 0.013 |
| Dispersing agent (7% aqueous solution of a mixture of ammonium mono- and di-hexadecafluorononyl- and eicosafluorohendecyl phosphates) | 0.70 |

The bomb was closed, evacuated and cooled with a carbon ice-acetone bath. Then 61 g. of chlorotrifluoroethylene was distilled into the bomb, which was sealed and agitated vigorously at 40° C. for 16 hours.

There was obtained an aqueous dispersion of polychlorotrifluoroethylene containing 15% solids.

Examples XX and XXI following illustrate the invention wherein the dispersing agent used is a water-soluble sulfuric acid ester of a polyfluoroalkanol falling under group C above:

EXAMPLE XX

A mixture of 0.5 part of potassium dodecafluoroheptyl sulfate, 0.05 part of potassium persulfate, 5 parts of paraffin and sufficient water to make up 100 parts was heated to 69–70° C. and deaerated by short boiling under reduced pressure. The mixture was maintained under 54–56 lbs./sq. in. tetrafluoroethylene pressure and agitated 6 hours at 69–70° C. There was obtained an aqueous colloidal dispersion of polytetrafluoroethylene containing 20.7% solids.

Under substantially the same conditions, but using ammonium hexadecafluorononyl sulfate as the dispersing agent, there was obtained a polytetrafluoroethylene dispersion containing 32.5% solids.

EXAMPLE XXI

Ethylene was polymerized as in Example IX, except that the charge consisted of 2 parts of ammonium persulfate, 2 parts of sodium bisulfite, 0.025 part of ferrous ammonium sulfate, 4 parts of disodium hydrogen phosphate and 4 parts of ammonium hexadecafluorononyl sulfate. There was obtained an aqueous dispersion of ethylene polymer. Coagulation of the dispersion by addition of acid gave a white powder having an inherent viscosity of 0.83 and a bending modulus of 61,000 lbs./sq. in.

Examples XXII and XXIII following illustrate the invention wherein the dispersing agent used is a water-soluble polyfluoroalkyl phosphonic acid or salt falling under group D discussed above:

EXAMPLE XXII

A mixture of 100 parts of distilled water, 10 parts of freshly distilled acrylonitrile, 0.5 part of a mixture of fluoroalkanephosphonic acids having the average composition of hexadecafluorooctanephosphonic acid, $H(CF_2CF_2)_4PO(OH)_2$, and 0.1 part of uranyl nitrate was placed under nitrogen in a glass vessel transparent to ultraviolet light. The mixture was stirred at 20–25° C. for five hours while being kept under nitrogen and while being irradiated by means of two 15-watt fluorescent bulbs placed at about 3 inches from the vessel. At the end of the reaction time the flask contained a uniform, milky-white dispersion of polyacrylonitrile.

EXAMPLE XXIII

A 0.5% solution of a mixture having the average composition of hexadecafluorooctanephosphonic acid in 146 parts of water, 0.04 part of potassium persulfate, and 45 parts of vinyl chloride were charged into a stainless steel bomb having a volume capacity of 500 parts of water. The bomb was heated at 65° C. with agitation for 10 hours. The product was a milky, fluid dispersion of polyvinyl chloride in water, containing 22.8% solids (90% yield). The dispersion was stable on further agitation.

Examples XXIV, XXV and XXVI following illustrate the invention wherein the dispersing agent used is a water-soluble polyfluoroalkylamine salt falling under group E discussed above:

EXAMPLE XXIV

A solution of 1 part of hexadecafluorononylamine hydrochloride in 200 parts of copper-free deoxygenated water was charged into a rocking autoclave having a capacity of 1500 parts by volume, together with 0.5 part of $\alpha,\alpha'$-azobis(diisobutyramidine) hydrochloride, a water-soluble azo initiator. The autoclave was flushed with nitrogen, evacuated, pressured with ethylene at 900–1000 atm., then rocked at 65° C. until about 100 atm. of ethylene had been absorbed, which required about 2 hours. There was obtained a fluid, milky dispersion of ethylene polymer, containing 17.5% total solids. Electron photomicrographs showed that the polymer particles were spheroidal and about 0.5 micron in diameter.

EXAMPLE XXV

A glass vessel transparent to ultraviolet light was charged with 100 parts of distilled water, 10 parts of freshly distilled acrylonitrile, 0.5 part of hexadecafluorononylamine hydrochloride and 0.1 part of uranyl nitrate. This mixture was irradiated as in Example XXII. There was obtained a uniform, milky-white dispersion of polyacrylonitrile.

EXAMPLE XXVI

A 0.5% solution of hexadecafluorononylamine hydrochloride in 89 parts of water, 0.02 part of potassium persulfate and 28 parts of vinyl chloride were charged in a stainless steel bomb having a capacity of 500 parts of water, the bomb being cooled to −80° C., under a nitrogen atmosphere. The bomb was heated at 65° C. with agitation for 10 hours. There was obtained an aqueous dispersion of polyvinyl chloride.

Example XXVII following illustrates the invention wherein the dispersing agent used is a free polyfluoroalkanoic acid.

EXAMPLE XXVII

A mixture of 79 parts of distilled water, 20 parts of styrene, 0.1 part of potassium persulfate, and 1 part of a mixture of hexadecafluorononanoic acid and eicosafluoroundecanoic acid, having a neutralization equivalent of 460 and therefore the average composition $H(CF_2)_{8.28}COOH$, was stirred and heated at 65° C. for 6 hours under a nitrogen atmosphere. The mixture was then steam distilled. In this operation 13 parts of water and 9.7 parts of unchanged styrene were removed. The reaction product consisted of 67 parts of a stable aqueous polystyrene dispersion containing 8.8% of solids by weight.

It will be understood that the above examples are merely illustrative and that the present invention broadly comprises, in the polymerization of a monomeric ethylenically unsaturated organic compound in an aqueous medium to obtain a colloidal dispersion of polymer, the step of carrying out said polymerization in the presence of a water-soluble polymerization initiator and, as an ionizable dispersing agent, a compound having a solubility in water of at least 0.1% at 100° C. and comprising an ionic, hydrophilic portion and a hydrophobic portion, the latter being a fluoroalkyl group containing at least 6 aliphatic carbon atoms, all except at most one of which, and that one the closest to the solubilizing group, bearing at least two fluorine atoms, the terminal carbon atom bearing in addition an atom from the group consisting of hydrogen and fluorine. The invention also comprises the stable aqueous colloidal dispersion of polymer obtainable by the use of such step and containing a dispersing agent as above defined.

The amount of dispersing agent is not sharply critical. It can vary, for example, from 0.01% to 10% by weight of the aqueous medium (water) used, a preferred range being between 0.1% and 3%. In general, the lower the colloidal polymer concentration desired in a given time, the smaller may be the amount of dispersing agent used.

In one embodiment of the invention, particularly when the monomer to be polymerized is a haloethylene, it is advantageous to add to the aqueous medium, as a stabilizer, from 0.1% to 12%, based on the weight of the water, of a saturated hydrocarbon having more than 16 carbon atoms and which is liquid under the polymerization conditions. Preferably, the stabilizer is one or a mixture of several hydrocarbons having from 24 to 60 carbon atoms and is used in amounts of 1% to 5% by weight of the water in which the polymer dispersion is to be formed. Such hydrocarbons include eicosane, tetracosane, tetracontane, hexacontane, the mixture of hydrocarbons sold commercially as white mineral oil, and, particularly, the paraffin waxes melting at a temperature below that to be used in the polymerization, e. g., normally below 100° C. The use of these hydrocarbons as stabilizers in the polymerization of tetrafluoroethylene is more fully disclosed and claimed in U. S. application Serial No. 107,135, filed on July 27, 1949, in the name of S. G. Bankoff. These hydrocarbons act as stabilizers in the polymerization process, that is, they prevent or retard the formation of coagulated polymer or, in other words, they increase the ratio of polymer present as suspensoid relative to coagulated polymer. The mechanism of stabilization by the paraffin hydrocarbons is not definitely established. However, it is known that coagulation of certain polymers such as polytetrafluoroethylene and polychlorotrifluoroethylene is self-promoting in that the rate of coagulation increases rapidly once coagulation has started. It is also known that any coagulum is found, at the end of the polymerization, in the oil phase formed by the water-insoluble hydrocarbon, provided the coagulation is not permitted to exceed the capacity of the oil phase to absorb the coagulum. It is therefore believed that the hydrocarbon stabilizer sequesters adventitious coagulation nuclei arising from premature coagulation by any one of a number of possible causes. Thus, the coagulum is removed from the dispersion, forestalling the promotion of further coagulation.

The essential feature of the present invention is the use, as a dispersing agent, of an ionizable compound having a solubility in water of at least 0.1% at 100° C. and comprising an ionic (cationic or anionic) hydrophilic portion and a hydrophobic portion which is a fluoroalkyl group containing at least 6 aliphatic carbon atoms, all except at most one of which, and that one the closest to the solubilizing group, bearing at least two fluorine atoms, the terminal carbon atom bearing in addition an atom of hydrogen or fluorine. The invention is broadly applicable to the use, as a dispersing agent, of any compound as thus defined. Five different groups of compounds have been discussed rather fully above and they are particularly advantageous groups for use as dispersing agents in the invention as are the numerous specific compounds mentioned in connection therewith and those used in the various examples. However, while these are preferred compounds of the class defined, the other compounds in the class are entirely operable and, in many instances, as efficient as the preferred compounds but not as practical to use because they are not so readily available.

The present invention is applicable broadly to the polymerization of monomeric ethylenically unsaturated organic compounds in an aqueous medium. Any such monomeric organic compound adapted to be polymerized in aqueous media can be used although the invention naturally is of greater value as applied to the polymerization of those monomers most difficult to polymerize directly to obtain satisfactory colloidal dispersions of the polymers. The haloethylenes, particularly tetrafluoroethylene and chlorotrifluoroethylene, have proved as difficult as any of the monomers to polymerize directly to obtain colloidal dispersions of polymer and, hence, the invention is of outstanding value as applied to the haloethylenes.

The examples illustrate the invention as applied to monomeric compounds of widely different types including the difficult haloethylenes, ethylene itself, and various commonly used monomers which it has been possible to polymerize to give colloidal dispersions using conventional dispersing agents.

Monomeric ethylenically unsaturated organic compounds adapted to be polymerized in aqueous media are, in general, well known to the art. Of these, all of which can be used in the present invention, the most important from the technological standpoint are the compounds having a terminal carbon-to-carbon double bond and the general formula

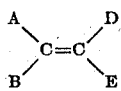

wherein A and B are hydrogen or halogen (fluorine, chlorine, bromine and iodine) and D and E are hydrogen, halogen, hydrocarbon radicals (e. g., alkyl, alkenyl, cycloalkenyl, aryl, aralkyl, aralkenyl), haloalkenyl, cyano, carboxy, carbalkoxy, acyloxy, aldehyde, ketone, amido, imido, ether groups and the like. Thus, in addition to the monomers of the examples, there may be mentioned as important polymerizable materials vinyl halides (vinyl fluoride, bromide and iodide); vinylidene halides such as 1,1-difluoroethylene, 1,1-dichloroethylene, 1,1-dichloro-2,2 - difluoroethylene; vinyl and vinylidene hydrocarbons such as propylene, isobutylene, 1,3-butadiene, vinylcyclohexene, vinyl naphthalene, propenylbenzene, 1-phenyl-1,3-butadiene, 2-phenyl-1,3-butadiene; halovinyl and halovinylidene hydrocarbons such as 2-fluoro-1,3-butadiene, 2,3-dichloro-1,3-butadiene, 2-iodo-1,3-butadiene; acrylyl and alkacrylyl compounds, e. g., acrylic, haloacrylic and alkacrylic acids, esters, nitriles and amides, for example, acrylic acid, methacrylic acid, alpha-chloroacrylic acid, ethyl acrylate, methyl methacrylate, butyl methacrylate, methoxymethyl methacrylate, chloroethyl methacrylate, beta-diethylaminoethyl methacrylate, methacrylonitrile, acrylamide, methacrylamide; vinyl carboxylates such as vinyl formate, vinyl chloracetate, vinyl butyrate, vinyl laurate; unsaturated aldehydes and ketones, such as acrolein, methacrolein, methyl vinyl ketone; N-vinyl imides such as N-vinylphthalimide, N-vinylsuccinimide; unsaturated ethers such as vinyl ethyl ether, vinyl isobutyl ether, 2-phenoxy-1,3-butadiene; and other vinyl monomers such as vinyl pyridine, N-vinylcaprolactam, N-vinylbutyrolactam and the like, and other unsaturates which, while not readily polymerizable per se, are capable of forming copolymers, such as dimethyl and diethyl fumarate, dimethyl and diethyl maleate, allyl glycidyl ether and the like. Two or more monomers may be polymerized simultaneously, thus leading to copolymers.

The invention finds specific usefulness in the polymerization in aqueous systems of completely halogenated ethylenes in which at least two of the four halogen atoms are fluorine, the remaining halogen atoms, if any, being chlorine. These compounds (tetrafluoroethylene, trifluorochloroethylene, 1,1-difluoro-2,2-dichloroethylene, 1,2-difluoro-1,2-dichloroethylene) are especially difficult to handle in aqueous dispersion polymerization systems since the conventional dispersing agents interrupt the polymerization at short polymer chains, with the result that the reaction stops at very low polymer concentrations. With the fluoroalkyl dispersing agents used in the process of this invention, on the other hand, it is possible to obtain readily fluoroethylene polymer dispersions of very high polymer concentration. With tetrafluoroethylene and trifluorochloroethylene in particular, the dispersions obtained not only may be far more concentrated than any heretofore obtainable directly by polymerizing the monomer in aqueous medium but these dispersions are highly stable on storage and, in general, are characterized by the fineness of the polymer particles substantially all of which have at least one dimension less than 0.1 micron. The fineness of the polymer particles is particularly characteristic of the tetrafluoroethylene polymer dispersions.

A peculiar characteristic of the tetrafluoroethylene dispersions prepared by the instant process, is that a considerable number of the polymer particles are distinctly elongated, ribbon-like structures which are apparently rather stiff since they have no appreciable tendency to loop although they frequently appear in photomicrographs to be twisted along their axes. As shown by electron photomicrographs these ribbon-like particles have a thickness in the range of about 0.01 to 0.05 micron and a width of less than about 0.07 micron while their length ranges up to 4 microns and even more with the ratio of length to width being at least 5:1 and in some instances as high as 400:1 or even higher. The proportion of these ribbon-like particles formed in the dispersion varies considerably as conditions vary. Although these dispersions are highly stable, it has been observed, particularly with the more concentrated dispersions, that part or all of the ribbon-like particles therein may flocculate on long standing but they can be redispersed at will simply by agitating the dispersion.

As more fully disclosed and claimed in applicant's copending application Serial No. 107,136 entitled "Aqueous Colloidal Dispersions of Polytetrafluoroethylene and the Formation of Shaped Structures Therefrom" and filed on July 27, 1949, polytetrafluoroethylene dispersions obtainable by the present process and containing at least 5% of the polymer particles in this ribbon-like shape may be extruded and coagulated to form filaments having a tenacity greater than 25 lbs./sq. in. before sintering. In view of the strength of the extruded and coagulated filament, it is entirely practical to spin these dispersions into filaments which was not feasible with heretofore known dispersions because they would not form a filament having sufficient mechanical strength before sintering to handle. To illustrate, the polytetrafluoroethylene dispersion of Example I was flowed from a spinneret having a diameter of approximately 0.01 inch under the surface of a 0.5% solution of hydrogen chloride in water. The coagulated, gelatinous filament was conducted from the bath into the air where it was dried, then heated at a temperature in the range of 327°–400° C. for the short time, one second or less, required to change its appearance from translucent to transparent. The hot filament was cooled rapidly, then cold drawn to approximately four times its original length. There resulted a transparent filament having a round cross-section of 0.003–0.004 inch in diameter. This filament was highly oriented as indicated by its X-ray diffraction pattern. It had a tensile strength of 14,000 lbs./sq. in. with an elongation of 80% before breaking.

The novel dispersions obtainable by the process of this invention have many valuable industrial applications in addition to their unique suitability for spinning into filaments. Thus, they are eminently suitable for the casting of coherent, flexible, strong films, either as unsupported pellicles or as coatings for wood, metal, wire screens, ceramics, textiles and the like. The films can conveniently be cast by treating the flow-out with an acid such as hydrochloric or sulfuric acid which coagulates the dispersion, or by exposing the flow-out to acidic vapors such as hydrogen chloride. Wire coatings of superior properties are readily obtained by heating wires coated from concentrated dispersions. Fibrous material, including cotton, wool, silk, glass fabrics, asbestos, paper, etc., can be impregnated with these dispersions, which are then coagulated by treatment with an acidic agent and/or heat and/or any drying process to eliminate water.

As many apparently widely different embodiments of this invention may be made without departing from the spirit and scope thereof, it is to be understood that the invention is not limited to the specific embodiments thereof except as defined in the appended claims.

The invention claimed is:

1. In the polymerization of a monomeric ethylenically unsaturated organic compound in an aqueous medium to obtain a colloidal dispersion of polymer, the step of carrying out said polymerization in the presence of a water-soluble polymerization initiator and, as an ionizable dispersing agent, a compound having a solubility in water of at least 0.1% at 100° C. and comprising an ionic hydrophilic portion and a hydrophobic portion, said latter being a fluoroalkyl group containing at least 6 aliphatic carbon atoms, all except at most one of which, and that one the closest to said solubilizing group, bearing at least 2 fluorine atoms, the terminal carbon atom bearing in addition an atom from the group consisting of hydrogen and fluorine.

2. Process as set forth in claim 1 wherein said dispersing agent is present in the amount of 0.01%–10% by weight of said aqueous medium.

3. Process as set forth in claim 1 wherein said dispersing agent is present in the amount of 0.1%–3% by weight of said aqueous medium.

4. Process as set forth in claim 1 wherein said monomeric ethylenically unsaturated organic compound is from the group consisting of tetrafluoroethylene and chlorotrifluoroethylene.

5. In the polymerization of a monomeric ethylenically unsaturated organic compound in an aqueous medium to obtain a colloidal dispersion of polymer, the step of carrying out said polymerization in the presence of (A) a water-soluble polymerization initiator, (B) as an ionizable dispersing agent, a compound having a solubility in water of at least 0.1% at 100° C. and comprising an ionic hydrophilic portion and a hydrophobic portion, said latter being a fluoroalkyl group containing at least 6 aliphatic carbon atoms, all except at most one of which, and that one of the closest to said solubilizing group, bearing at least 2 fluorine atoms, the terminal carbon atom bearing in addition an atom from the group consisting of hydrogen and fluorine, and (C), as a stabilizer, 0.1%–12%, by weight of said aqueous medium, of a saturated hydrocarbon having more than 16 carbon atoms and which is liquid under the polymerization conditions.

6. Process as set forth in claim 5 wherein said ionizable dispersing agent is a salt having a solubility in water of at least 0.1% at 100° C. from the group consisting of the alkali metal, ammonium, and substituted ammonium salts of a polyfluoroalkanoic acid having the formula $B(CF_2)_nCOOH$, wherein B is from the group consisting of hydrogen and fluorine and $n$ is an integer from 6 to 20, inclusive.

7. Process as set forth in claim 5 wherein said monomeric ethylenically unsaturated organic compound is from the group consisting of tetrafluoroethylene and chlorotrifluoroethylene.

8. Process as set forth in claim 5 wherein said saturated hydrocarbon has from 24 to 60 carbon atoms and is present in the amount of 1%–5% by weight of said aqueous medium.

9. Process as set forth in claim 8 wherein said ionizable dispersing agent is a salt having a solubility in water of at least 0.1% at 100° C. from the group consisting of the alkali metal, ammonium, and substituted ammonium salts of a polyfluoroalkanoic acid having the formula $B(CF_2)_nCOOH$, wherein B is from the group consisting of hydrogen and fluorine and $n$ is an integer from 6 to 20, inclusive.

10. In the polymerization of a monomeric ethylenically unsaturated organic compound in an aqueous medium to obtain a colloidal dispersion of polymer, the step of carrying out said polymerization in the presence of a water-soluble polymerization initiator and, as an ionizable dispersing agent, a salt having a solubility in water of at least 0.1% at 100° C. from the group consisting of the alkali metal, ammonium, and substituted ammonium salts of a polyfluoroalkanoic acid having the formula $B(CF_2)_nCOOH$, wherein B is from the group consisting of hydrogen and fluorine and $n$ is an integer from 6 to 20, inclusive.

11. Process as set forth in claim 10 wherein said polyfluoroalkanoic acid has the formula $H(CF_2)_nCOOH$ wherein $n$ is an even integer from 6 to 12, inclusive.

12. Process as set forth in claim 10 wherein said monomeric ethylenically unsaturated organic compound is from the group consisting of tetrafluoroethylene and chlorotrifluoroethylene.

13. In the polymerization of a monomeric ethylenically unsaturated organic compound in an aqueous medium to obtain a colloidal dispersion of polymer, the step of carrying out said polymerization in the presence of a water-soluble polymerization initiator and, as an ionizable dispersing agent, ammonium hexadecafluorononanoate.

14. In the polymerization of a monomeric ethylenically unsaturated organic compound in an aqueous medium to obtain a colloidal dispersion of polymer, the step of carrying out said polymerization in the presence of a water-soluble polymerization initiator and, as an ionizable dispersing agent, potassium hexadecafluorononanoate.

15. In the polymerization of a monomeric ethylenically unsaturated organic compound in an aqueous medium to obtain a colloidal dispersion of polymer, the step of carrying out said polymerization in the presence of a water-soluble polymerization initiator and, as an ionizable dispersing agent, ammonium eicosafluoroundecanoate.

16. In the polymerization of a monomeric ethylenically unsaturated organic compound in an aqueous medium to obtain a colloidal dispersion of polymer, the step of carrying out said polymerization in the presence of a water-soluble polymerization initiator and, as an ionizable dispersing agent, ammonium dodecafluoroheptanoate.

17. In the polymerization of a monomeric ethylenically unsaturated organic compound in an aqueous medium to obtain a colloidal dispersion of polymer, the step of carrying out said polymerization in the presence of a water-soluble polymerization initiator and, as an ionizable dispersing agent, ammonium hexadecafluorononyl sulfate.

18. A stable aqueous colloidal dispersion of the polymer of a monomeric ethylenically unsaturated organic compound, said dispersion containing, as an ionizable dispersing agent, a compound having a solubility in water of at least 0.1% at 100° C. and comprising an ionic hydrophilic portion and a hydrophobic portion, said latter being a fluoroalkyl group containing at least 6 aliphatic carbon atoms, all except at most one of which, and that one the closest to said solubilizing group, bearing at least 2 fluorine atoms, the terminal carbon atom bearing in addition an atom from the group consisting of hydrogen and fluorine.

19. A dispersion as set forth in claim 18 wherein said ionizable dispersing agent is present in the amount of 0.01%–10% by weight of the aqueous medium of said dispersion.

20. A dispersion as set forth in claim 18 wherein said ionizable dispersing agent is present in the amount of 0.1%–3% by weight of the aqueous medium of said dispersion.

21. A dispersion as set forth in claim 18 wherein said monomeric ethylenically unsaturated organic compound is from the group consisting of tetrafluoroethylene and chlorotrifluoroethylene.

22. A dispersion as set forth in claim 21 wherein said ionizable dispersing agent is present in the amount of 0.1%–3% by weight of the aqueous medium of said dispersion.

KENNETH L. BERRY.

No references cited.

Certificate of Correction

Patent No. 2,559,752

July 10, 1951

KENNETH L. BERRY

It is hereby certified that error appears in the printed specification of the above numbered patent requiring correction as follows:

Column 2, line 44, for "have" read *having*; column 9, line 48, heading to the table, for the word "*Table*" read *Table I*; line 57, for "in the table" read *in Table I*; column 10, line 5, for "colled" read *cooled*;

and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*